(12) United States Patent
Sapugay et al.

(10) Patent No.: US 10,740,566 B2
(45) Date of Patent: *Aug. 11, 2020

(54) METHOD AND SYSTEM FOR AUTOMATED INTENT MINING, CLASSIFICATION AND DISPOSITION

(71) Applicant: ServiceNow, Inc., Santa Clara, CA (US)

(72) Inventors: Edwin Sapugay, Foster City, CA (US); Anil Kumar Madamala, Sunnyvale, CA (US); Maxim Naboka, Santa Clara, CA (US); Srinivas SatyaSai Sunkara, Sunnyvale, CA (US); Lewis Savio Landry Santos, Santa Clara, CA (US); Murali B. Subbarao, Saratoga, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,681

(22) Filed: Nov. 2, 2018

(65) Prior Publication Data

US 2019/0294673 A1 Sep. 26, 2019

Related U.S. Application Data

(60) Provisional application No. 62/659,710, filed on Apr. 19, 2018, provisional application No. 62/657,751, (Continued)

(51) Int. Cl.
*G06F 40/30* (2020.01)
*G06F 16/28* (2019.01)
(Continued)

(52) U.S. Cl.
CPC .......... *G06F 40/30* (2020.01); *G06F 16/2465* (2019.01); *G06F 16/285* (2019.01);
(Continued)

(58) Field of Classification Search
USPC ....................................................... 704/7–10
See application file for complete search history.

(56) References Cited

U.S. PATENT DOCUMENTS

| | | |
|---|---|---|
| 7,062,683 B2 | 6/2006 | Warpenburg |
| 7,509,653 B2 | 3/2009 | Das et al. |

(Continued)

OTHER PUBLICATIONS

Kim Joo-Kyung et al.: "Intent detection using semantically enriched word embeddings", 2016 IEEE Spoken Language Technology Workshop, IEEE, Dec. 13, 2016; XP033061772, pp. 414-419.

(Continued)

*Primary Examiner* — Leonard Saint Cyr
(74) *Attorney, Agent, or Firm* — Fletcher Yoder PC

(57) ABSTRACT

An agent automation system includes a memory configured to store a corpus of utterances and a semantic mining framework and a processor configured to execute instructions of the semantic mining framework to cause the agent automation system to perform actions, wherein the actions include: detecting intents within the corpus of utterances; producing intent vectors for the intents within the corpus; calculating distances between the intent vectors; generating meaning clusters of intent vectors based on the distances; detecting stable ranges of cluster radius values for the meaning clusters; and generating an intent/entity model from the meaning clusters and the stable ranges of cluster radius values, wherein the agent automation system is configured to use the intent/entity model to classify intents in received natural language requests.

20 Claims, 9 Drawing Sheets

Related U.S. Application Data filed on Apr. 14, 2018, provisional application No. 62/652,903, filed on Apr. 5, 2018, provisional application No. 62/646,917, filed on Mar. 23, 2018, provisional application No. 62/646,915, filed on Mar. 23, 2018, provisional application No. 62/646,916, filed on Mar. 23, 2018.

(51) Int. Cl.
| | |
|---|---|
| *G06F 16/2458* | (2019.01) |
| *G06N 5/04* | (2006.01) |
| *G06F 40/247* | (2020.01) |
| *G06F 40/295* | (2020.01) |
| *G06N 20/00* | (2019.01) |

(52) U.S. Cl.
CPC .......... *G06F 40/247* (2020.01); *G06F 40/295* (2020.01); *G06N 5/04* (2013.01); *G06F 2216/03* (2013.01); *G06N 20/00* (2019.01)

(56) References Cited

U.S. PATENT DOCUMENTS

| | | | |
|---|---|---|---|
| 7,610,512 B2 | 10/2009 | Gerber | |
| 7,617,073 B2 | 11/2009 | Trinon | |
| 7,617,500 B2 | 11/2009 | Astl et al. | |
| 7,630,784 B2 | 12/2009 | Hunt et al. | |
| 7,653,650 B2 | 1/2010 | Kulkarni et al. | |
| 7,849,201 B1 | 12/2010 | Subbarao et al. | |
| 7,890,802 B2 | 2/2011 | Gerber | |
| 8,006,240 B2 | 4/2011 | Bhatkhande et al. | |
| 7,945,860 B2 | 5/2011 | Vambenepe | |
| 7,958,031 B2 | 6/2011 | Hunt et al. | |
| 7,966,398 B2 | 6/2011 | Wiles | |
| 7,971,147 B2 | 6/2011 | Subbarao et al. | |
| 8,112,354 B2 | 2/2012 | Lalwani et al. | |
| 8,156,479 B2 | 4/2012 | Fong et al. | |
| 8,224,683 B2 | 7/2012 | Manos | |
| 8,433,654 B2 | 4/2013 | Subbarao et al. | |
| 8,473,361 B2 | 6/2013 | Subbarao et al. | |
| 8,612,289 B2 | 12/2013 | Subbarao et al. | |
| 8,650,078 B2 | 2/2014 | Subbarao et al. | |
| 8,674,992 B2 | 3/2014 | Poston | |
| 9,626,717 B2 | 4/2017 | Sapugay et al. | |
| 9,633,004 B2 | 4/2017 | Giuli et al. | |
| 10,268,679 B2* | 4/2019 | Li | G06F 17/279 |
| 2006/0130038 A1 | 6/2006 | Claussen et al. | |
| 2007/0261065 A1 | 11/2007 | Astl et al. | |
| 2008/0075444 A1 | 3/2008 | Subbarao et al. | |
| 2011/0238408 A1* | 9/2011 | Larcheveque | G06F 17/2785 704/9 |
| 2012/0246073 A1 | 9/2012 | Gore et al. | |
| 2012/0290938 A1 | 11/2012 | Subbarao et al. | |
| 2014/0207441 A1 | 7/2014 | Larcheveque et al. | |
| 2014/0279274 A1 | 9/2014 | Subbarao et al. | |
| 2014/0297457 A1 | 10/2014 | Sapugay et al. | |
| 2014/0297458 A1 | 10/2014 | Sapugay et al. | |
| 2015/0269573 A1 | 9/2015 | Subbarao et al. | |
| 2017/0069310 A1 | 3/2017 | Hakkani-Tur et al. | |
| 2018/0083892 A1 | 3/2018 | Viswanathan et al. | |
| 2018/0157638 A1* | 6/2018 | Li | G06F 17/279 |

OTHER PUBLICATIONS

Jiahui Gu: "Query Intent Detection Based on Clustering of Phrase Embedding", Social Media Processing: SMP 2016 5th National Conference, vol. 669, Jan. 1, 2016; pp. 110-122, XP009515060.
Extended European Search Report for European Patent Application No. 19162885.8 dated Aug. 23, 2019; 8 pgs.

* cited by examiner

METHOD AND SYSTEM FOR AUTOMATED INTENT MINING, CLASSIFICATION AND DISPOSITION

CROSS-REFERENCE

This application claims priority from and the benefit of U.S. Provisional Application No. 62/646,915, entitled "HYBRID LEARNING SYSTEM FOR NATURAL LANGUAGE UNDERSTANDING," filed Mar. 23, 2018; U.S. Provisional Application No. 62/646,916, entitled "VOCABULARY MANAGEMENT IN A NATURAL LEARNING FRAMEWORK," filed Mar. 23, 2018; U.S. Provisional Application No. 62/646,917, entitled "METHOD AND SYSTEM FOR AUTOMATED INTENT MINING, CLASSIFICATION AND DISPOSITION," filed Mar. 23, 2018; U.S. Provisional Application No. 62/657,751, entitled "METHOD AND SYSTEM FOR FOCUSED CONVERSATION CONTEXT MANAGEMENT IN A BEHAVIOR ENGINE," filed Apr. 14, 2018; U.S. Provisional Application No. 62/652,903, entitled "TEMPLATED RULE-BASED DATA AUGMENTATION FOR INTENT EXTRACTION FROM SPARSE DATA," filed Apr. 5, 2018; and U.S. Provisional Application No. 62/659,710, entitled "WRITTEN-MODALITY PROSODY SUBSYSTEM IN A NLU FRAMEWORK," filed Apr. 19, 2018, which are hereby incorporated by reference in their entirety for all purposes.

BACKGROUND

The present disclosure relates generally to the field of natural language understanding (NLU), and more specifically, to mining intents from natural language utterances.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue. While a number of methods exist today to classify intents, these method are predicated on the preexistence of an intent model. That is, natural language understanding (NLU) engines are generally designed to classify or infer intents from received natural language utterances based on an existing intent model. Intent models are typically manually created by designers to define relationships between particular intents and particular sample natural language utterances. Since the intent models used by NLU engines are often lengthy and complex, substantial time and cost can be expended in their creation. Additionally, since the manner in which users express intent is subject to change over time, substantial time and cost may also expended updating and maintaining the intent model.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a natural language understanding (NLU) system capable of unsupervised generation of an intent/entity model from a corpus of source data (e.g., chat logs, email strings, forum entries, support request tickets, recordings of help line calls, or a combination thereof). As discussed, the disclosed agent automation framework is a system that includes a semantic mining framework designed to cooperate with the NLU framework to generate and improve the intent/entity model based on an intent mining process that is performed on the corpus. In particular, the NLU framework is designed to produce a set of intent vectors representing intents present within the corpus, and calculates distances between these intent vectors. The semantic mining framework extracts suitable cluster radii (e.g., naturally stable cluster formation ranges) based on these distances to identify suitable meaning clusters that can be used as a basis for the intent/entity model. In certain embodiments, the semantic mining framework can generate the intent/entity model automatically based on predefined parameters of the desired intent/entity model, while in other embodiments, the semantic mining framework generates suitable outputs (e.g., intent vectors, meaning clusters, stable cluster size ranges) that a designer can use as a basis for the generation of a more subjective intent/entity model.

For example, the disclosed semantic mining framework can generate suitable data structures (e.g., cluster formation trees, dendrograms) that enable a user (e.g., a virtual agent designer or other reasoning agent/behavior engine designer) to navigate and explore extracted cluster radii for conversation modeling or analytics purposes. The semantic mining framework is further designed to assist in improving a conversation model, such as discovering blind spots in the conversational model, based on the generated intent/entity model. Using the generated intent/entity model, the agent automation framework can determine intents of a newly received utterance, such as a user request via a virtual agent, and determine a suitable response to the utterance based on the conversation model. Furthermore, the intent/entity model and/or conversation model may continue to be updated and improved based on newly received utterances, such that the performance and accuracy of the agent automation framework improves over time. Additionally, the disclosed semantic mining framework is able to be combined with different NLU engines or frameworks (e.g., to map intents into vectors within a vector space and/or to perform intent vector distance calculations), in accordance with the present disclosure.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
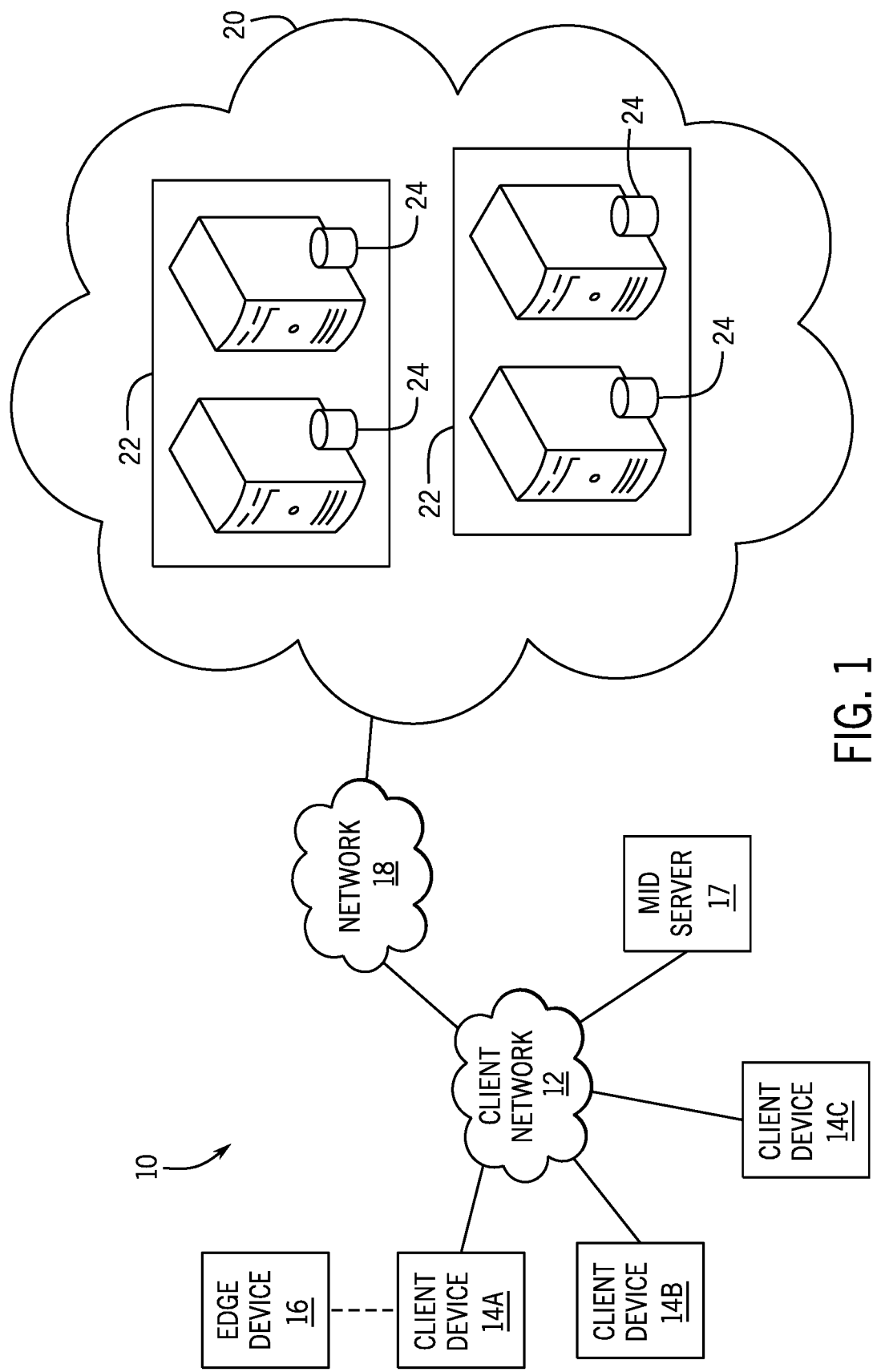
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" or "computing device" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "machine-readable medium" may include a single medium or multiple media (e.g., a centralized or distributed database, and/or associated caches and servers) that store one or more instructions or data structures. The term "non-transitory machine-readable medium" shall also be taken to include any tangible medium that is capable of storing, encoding, or carrying instructions for execution by the computing system and that cause the computing system to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

As used herein, the terms "application" and "engine" refer to one or more sets of computer software instructions (e.g., computer programs and/or scripts) executable by one or more processors of a computing system to provide particular functionality. Computer software instructions can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities) from natural language utterances based on an intent/entity model. As used herein, a "reasoning agent/behavior engine" refers to a rule-based agent, such as a virtual assistant, designed to interact with other agents based on a conversation model. For example, a "virtual agent" may refer to a particular example of a reasoning agent/behavior engine that is designed to interact with users via natural language requests in a particular conversational or communication channel. By way of specific example, a virtual agent may be or include a chat agent that interacts with users via natural language requests and responses in a chat room environment. Other examples of virtual agents may include an email agent, a forum agent, a ticketing agent, a telephone call agent, and so forth, which interact with users in the context of email, forum posts, and autoreplies to service tickets, phone calls, and so forth.

As used herein, an "intent" refers to a desire or goal of an agent which may relate to an underlying purpose of a communication, such as an utterance. As used herein, an "entity" refers to an object, subject, or some other parameterization of an intent. As used herein, an "intent/entity model" refers to an intent model that associates particular intents with particular utterances, wherein certain entity data can be encoded as parameters of intents within the model. As used herein, the term "agents" may refer to either persons (e.g., users, administrators, and customers) or computer-generated personas (e.g. chat agents or other virtual agents) that interact with one another within a conversational channel. As used herein, a "corpus" refers to a captured body of source data that includes interactions between various agents, wherein the interactions include communications or conversations within one or more suitable types of media (e.g., a help line, a chat room or message string, an email string). As used herein, "source data" may include any suitable captured interactions between various agents, including but not limited to, chat logs, email strings, documents, help documentation, frequently asked questions (FAQs), forum entries, items in support ticketing, recordings of help line calls, and so forth. As used herein, an "utterance" refers to a single natural language statement made by an agent and which may include one or more intents. As such, an utterance may be part of a previously captured corpus of source data, and an utterance may also be a new statement made by an agent as part of an interaction with another agent (e.g., a user request of a virtual agent).

As mentioned, a computing platform may include a chat agent, or another similar virtual agent, that is designed to automatically respond to user requests to perform functions or address issues on the platform. As mentioned, NLU engines are generally designed to classify or infer intents from natural language requests based on an existing intent model. While intent models can be manually created that define relationships between particular intents and particular sample natural language utterances, this process can be costly and can result in limited intent models. Further, these intent models may be regularly manually updated to adjust to changes in intent expression within a particular conversational channel. Accordingly, present embodiments are directed toward a system capable of generating an intent/entity model with little or no human intervention by performing intent mining on a corpus of conversational source data from a particular conversation channel. Additionally, recognizing that intent/entity models can be subjective, present embodiments also provide suitable outputs (e.g., cluster formation trees, stable cluster size ranges) that can be used by a designer to construct a suitable intent/entity model for use in intent classification.

However, it is presently recognized that there are a number of considerations when generating an intent/entity model. For example, for existing methods, intent classification or characterization at a document level, paragraph level, utterance level, and/or sentence level can result in unsatisfactory results. For example, consider an utterance, "Please reset my password and please send me the password reset documentation so I can handle it later." This example utterance includes three intents (e.g., reset password, send documentation, self-sufficiency). It is presently recognized that segmenting the source data in this manner (e.g., at the proper intent level) enables the outputs of the semantic mining framework to be used to construct and improve the conversational model to be used by the reasoning agent/behavior engine to respond to future requests. As such, it is presently recognized that, to properly construct an intent/entity model, meaning should be extracted from a corpus of source data at an appropriate level of granularity (e.g., an atomic intent level) to properly capture the intents and entities.

Additionally, it is also presently recognized that meaning should be extracted from utterances while also maintaining intent and entity hierarchies present within the corpus of utterances. For example, an utterance, "Let us meet at the coffee shop by the mall," has three entities (e.g., "us", "coffee shop", and "mall"), and there is an explicit hierarchical entity structure where "mall" (a first entity) parameterizes "coffee shop" (a second entity). It is recognized that maintaining these hierarchical relationships enables meaningful analytics to be used in the interest of improving and optimizing the conversation model. That is, it is recognized that maintaining hierarchies of intents can enable a NLU framework to be more precise when performing comparisons during intent classification. As such, it is recognized that, by maintaining the compositionality of intent trees, for example, intent hierarchies and groupings can contribute to the overall meaning of an over-arching intent of an utterance.

In another example, an utterance includes a statement, "I want to reset my password." It is recognized that there are two intents (e.g., "I want . . . " and "reset my password") present within this example utterance. Since, compositionally, the "I want" intent contains the "reset my password" intent, the "reset my password" intent can be treated as a parameterization (or a child) of the "I want" intent. It is recognized that this hierarchical structure is useful to several aspects of NLU and intent/entity model generation. For example, based on this hierarchy, the "I want" intent and the "reset my password" intent (or a related intent) would be clustered together before other intents (e.g., "I want . . . " intent and a "shut down the server" intent). In other words, it is recognized that it may be desirable for sub-intents to contribute to a similarity measure between two intents, which can positively influence meaning cluster formation. Additionally, for similarity measures, sub-intents (and sub-entities) can act as modifiers that contribute to the similarity of the items being modified. For example, a "coffee shop by the mall" entity will match more closely with "coffee shop by the shopping center" than to "coffee shop at First Street and Main Street". As such, it is recognized that intent/entity hierarchies are important for analytics, precision in intent similarity, intent cluster detection, and so forth, when generating the intent/entity model.

Further, it is recognized that, within an intent/entity model, meaning cluster convergence rates can differ based on a NLU distance metric, as well as the source data provided. Accordingly, as discussed below, it is presently recognized that it is advantageous to extract meaning at differing cluster radii. For example, in certain embodiments, sufficiency and cluster granularity of the intent/entity models may be predefined based on user input.

With the foregoing in mind, present embodiments are directed to an agent automation framework capable of unsupervised generation of an intent/entity model from a corpus of utterances. As discussed, the disclosed agent automation framework includes a semantic mining framework designed to operate in conjunction with a NLU framework and a reasoning agent/behavior engine. In particular, the semantic mining framework is designed to cooperate with the NLU framework to generate and improve the intent/entity model based on an intent mining process that is performed on the source data of the corpus. In particular, the disclosed semantic mining framework is designed to cooperate with the NLU framework to produce a respective vector or set of vectors for each intent in the utterances of the corpus. That is, in terms of intent segmentation, the disclosed semantic mining framework is designed produce a respective intent vector for each atomic intent in the corpus, rather than generate a higher order intent vector (e.g., per utterance, per document, per collection of documents). Based on calculated distances between these intent vectors, the semantic mining framework determines suitable meaning clusters, as well as suitable cluster radii (e.g., naturally stable cluster formation ranges), to serve as a basis to generate the intent/entity model. Additionally, the semantic mining framework can determine intent distribution (e.g., how often particular intents are expressed in the corpus) and conversation patterns (e.g., how often particular intents led to particular responses or outcomes), which can be used to generate or improve conversational models used by virtual agents.

As discussed below, the disclosed semantic mining framework also generates suitable data structures (e.g., cluster formation trees and/or cluster dendrograms) that enable a user (e.g., a chat agent designer or other virtual agent designer) to navigate extracted cluster radii to design or improve an intent/entity model, for conversation modeling, for analytics purposes, and so forth. The semantic mining framework is further designed to assist in improving a conversation model, such as discovering blind spots in the conversational model, based on the generated intent/entity model. Using the generated intent/entity model, the agent automation framework can also determine intents of a newly received utterance, such as a user request, via a virtual agent and determine a suitable response to the utterance based on the conversation model. Furthermore, the intent/entity model and/or conversation model may continue to be updated and improved based on newly received utterances, such that the performance and accuracy of the agent automation framework improves over time. Additionally, the disclosed semantic mining framework is able to be combined with different NLU engines or frameworks (e.g., to produce intent vectors and to perform distance calculations between these intent vectors), in accordance with the present disclosure.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may host a management database (CMDB) system and/or other suitable systems. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
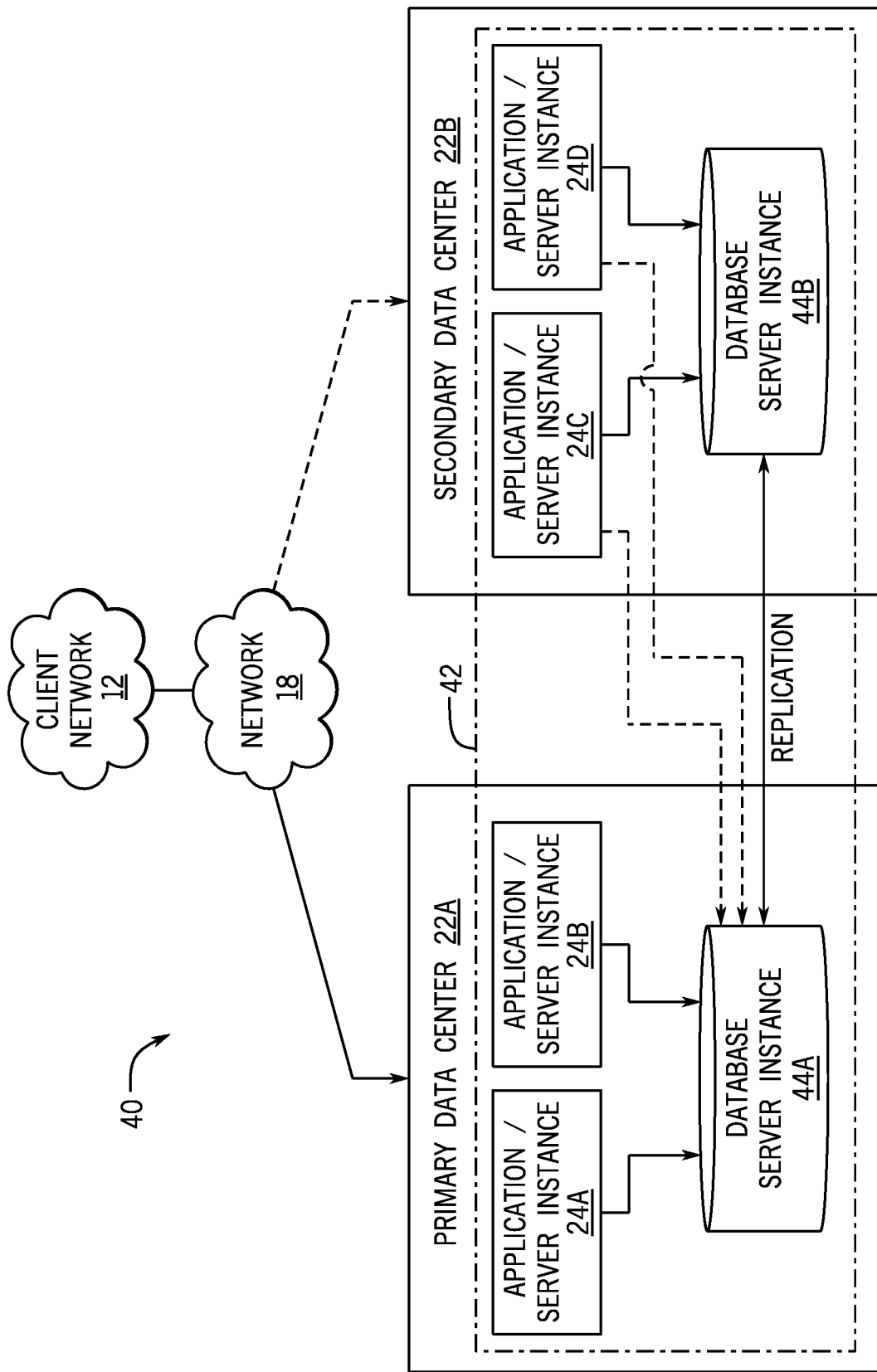
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the secondary second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
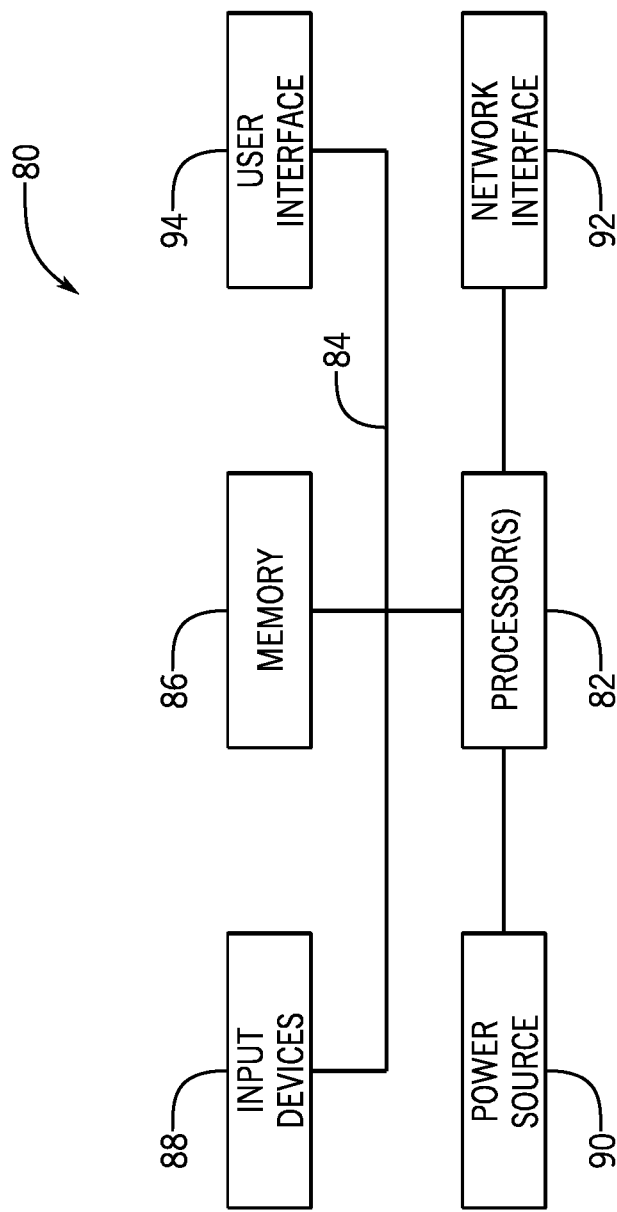
FIG. 3 is a block diagram of a computing device utilized in a computing system that may be present in FIG. 1 or 2, in accordance with aspects of the present technique.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 3, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example an architecture that may utilize NLU technologies. In particular, the cloud-based platform 20 may include or store a large corpus of source data that can be mined, as discussed below, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/ entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to analyze utterances within the corpus, as discussed below.

Figure 4A:
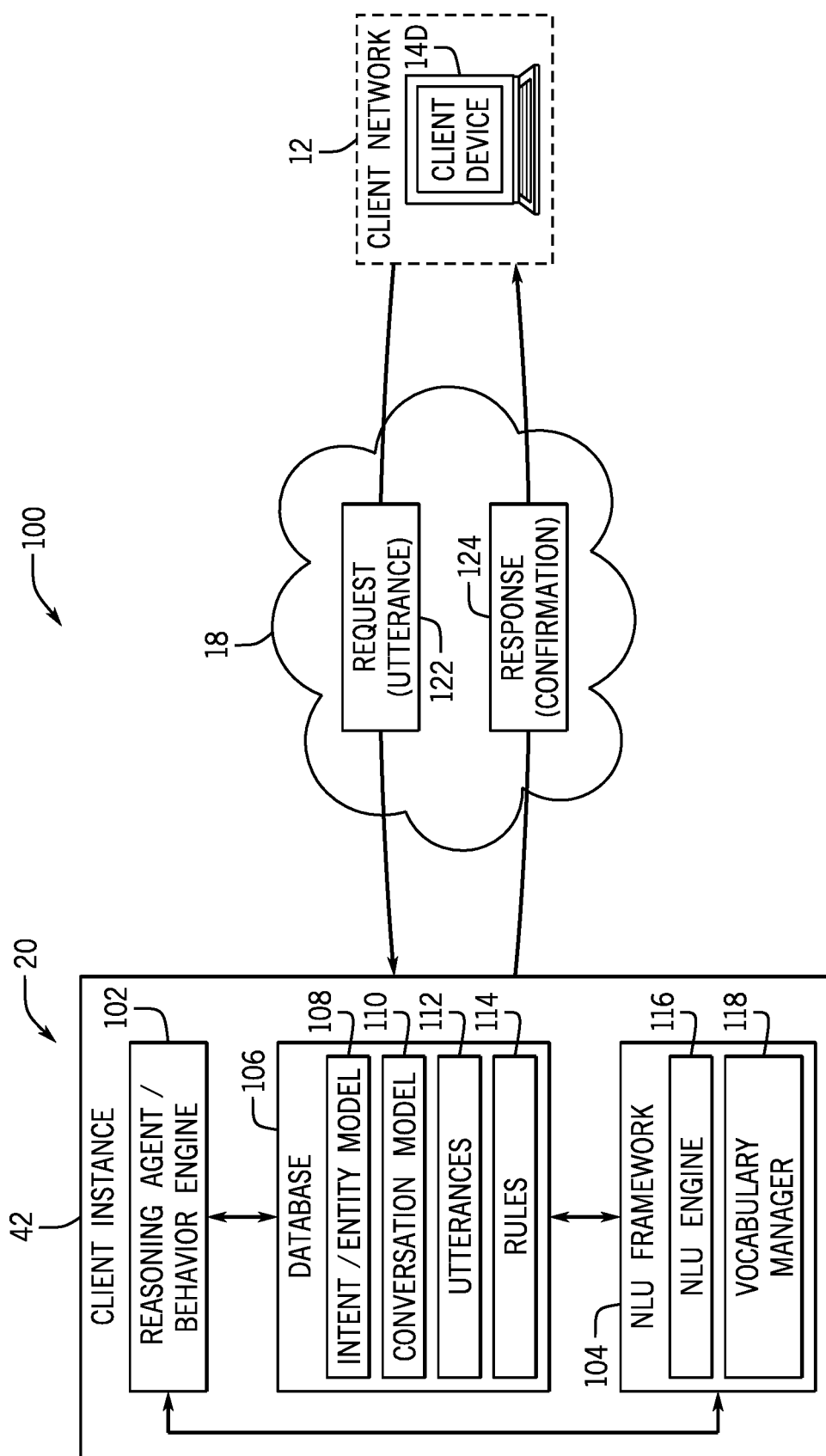
FIG. 4A is a schematic diagram illustrating an embodiment of an agent automation framework that includes a NLU framework that is part of a client instance hosted by the cloud computing system, in accordance with aspects of the present technique.

With the foregoing in mind, FIG. 4A illustrates an agent automation framework 100 (also referred to herein as an agent automation system) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine 102, a NLU framework 104, and a database 106, which are communicatively coupled within the client instance 42. It may be noted that, in actual implementations, the agent automation framework 100 may include a number of other components, including the semantic mining framework, which is discussed below with respect to FIG. 5. For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108 and a conversation model 110 in one or more tables (e.g., relational database tables) of the database 106. As mentioned, the intent/entity model 108 stores associations or relationships between particular intents and particular sample utterances. As discussed below, this intent/entity model 108 is derived from a set of intent vectors that are suitably grouped into meaning clusters. The conversation model 110 stores associations between intents of the intent/entity model 108 and particular responses and/or actions, which generally define the behavior of the reasoning agent/behavior engine 102. In certain embodiments, at least a portion of the associations within the conversation model are manually created or predefined by a designer of the reasoning agent/behavior engine 102 based on desired behaviors of the reasoning agent/behavior engine 102 in response to particular identified intents in processed utterances. It should be noted that, in different embodiments, the database 106 may store other database tables storing other information related to semantic data mining, such as a tables storing information regarding intent vectors, meaning clusters, cluster formation trees, sample utterances, stable cluster size ranges, and so forth, in accordance with the present disclosure.

As discussed below, the intent/entity model 108 is generated based on a corpus of utterances 112 and a collection of rules 114 that are also stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields.

For the illustrated embodiment, the NLU framework 104 includes an NLU engine 116 and a vocabulary manager 118. It may be appreciated that the NLU framework 104 may include any suitable number of other components. In certain embodiments, the NLU engine 116 is designed to perform a number of functions of the NLU framework 104, including generating intent vectors (also referred to herein as "intent vectorization") from intents in the corpus of utterances 112 and determining distances between these intent vectors.

The NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents. The vocabulary manager 118 addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to recycle words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, that the word "Everest" actually refers to the name of a conference room or a server rather than the name of a mountain.

Once the intent/entity model 108 and the conversation model 110 have been created, the agent automation framework 100 is designed to receive an utterance 122 (in the form of a natural language request) and to appropriately take action to address request. For example, for the embodiment illustrated in FIG. 4A, the reasoning agent/behavior engine 102 is a virtual agent that receives, via the network 18, the utterance 122 (e.g., a request in a chat communication) submitted by the client device 14D disposed on the client network 12. The reasoning agent/behavior engine 102 provides the utterance 122 to the NLU framework 104, and the NLU engine 116 is processes the utterance 122 based on the intent/entity model 108 to derive intents and entities within the utterance. Based on the intents derived by the NLU engine 116, as well as the associations within the conversation model 110, the reasoning agent/behavior engine 102 performs one or more particular predefined actions. For the illustrated embodiment, the reasoning agent/behavior engine 102 also provides a response 124 or confirmation to the client device 14D via the network 18, for example, indicating actions performed by the reasoning agent/behavior engine 102 in response to the received utterance 122. Additionally, in certain embodiments, the utterance 122 may be added to the utterances 112 stored in the database 106 for continued improvement of the intent/entity model 108 and/or the conversation model 110 via a semantic mining process, as discussed below.

It may be appreciated that, in other embodiments, one or more components of the agent automation framework 100 and/or the NLU framework 104 may be otherwise arranged, situated, or hosted. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the semantic mining framework 130 discussed below may be hosted by an enterprise instance that is communicatively coupled to the client instance 42, as well as other client instances, to enable semantic intent mining and generation of the intent/entity model 108.

Figure 4B:
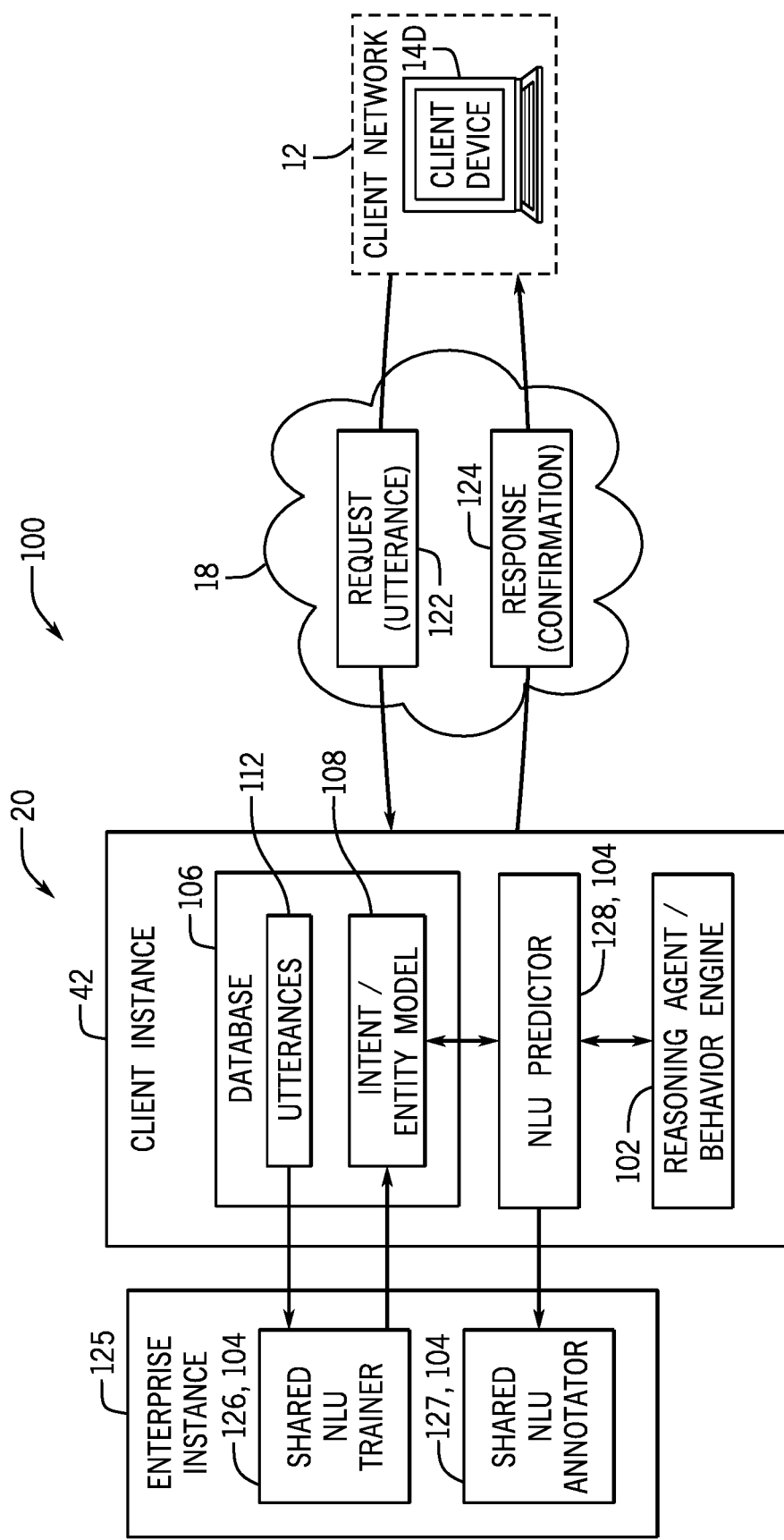
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate instance (e.g., enterprise instance 125) that is hosted by the cloud computing system 20. The illustrated enterprise instance 125 is communicatively coupled to exchange data related to intent/entity mining and intent classification with any suitable number of client instances via any suitable protocol (e.g., via suitable Representational State Transfer (REST) requests/responses). As such, for the design illustrated in FIG. 4B, by hosting a portion of the NLU framework as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that, in other embodiments, other organizations of the NLU framework 104 and/or the agent automation framework 100 may be used, in accordance with the present disclosure.

For the embodiment of the agent automation framework 100 illustrated in FIG. 4B, using the semantic mining framework discussed below, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the Reasoning Agent/Behavior Engine 102 receives the user utterance 122 provided by the client device 14D, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated intent/entities of the utterance 122 to the NLU predictor 128 of client instance 42.

Figure 5:
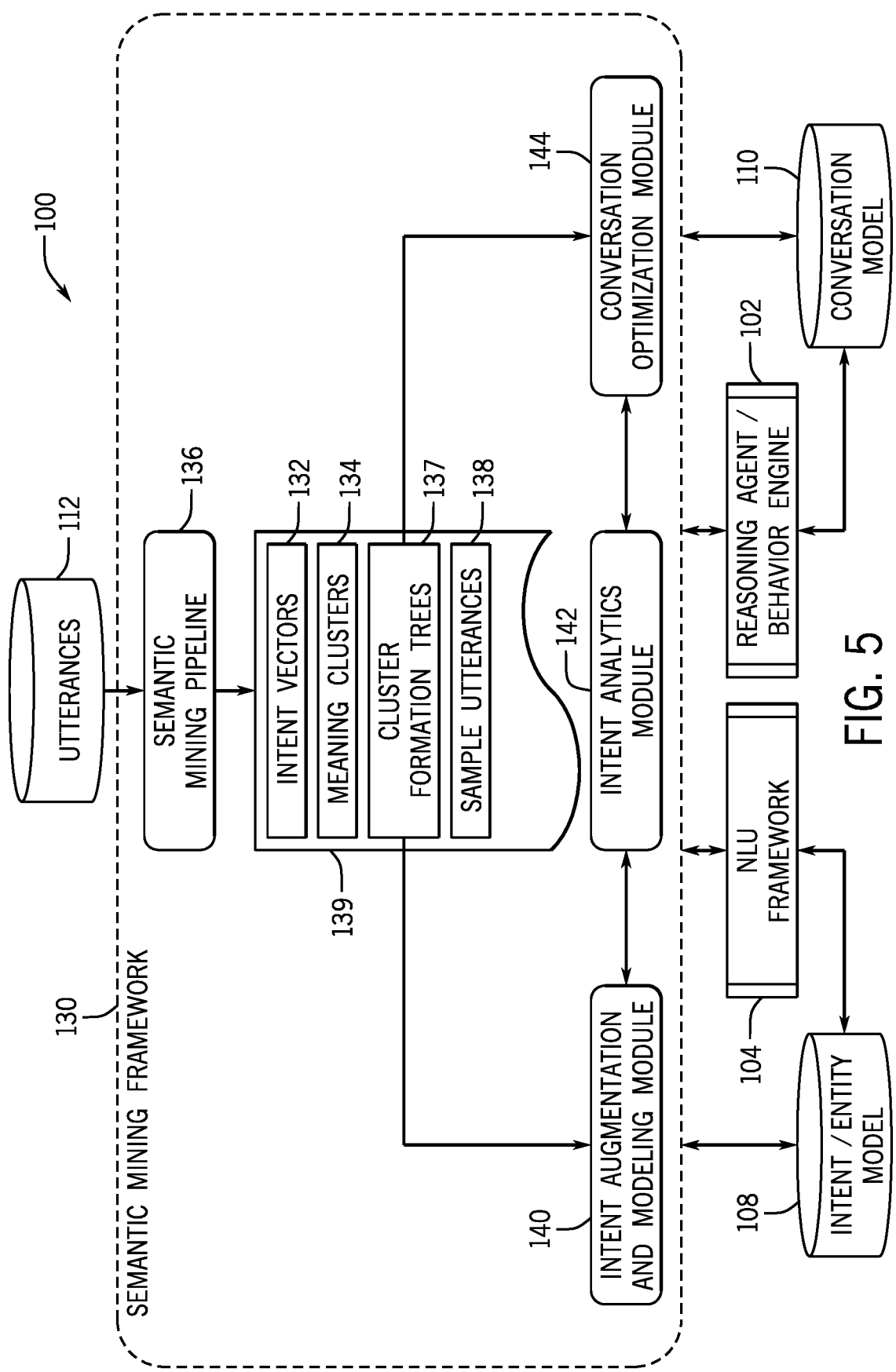
FIG. 5 is a block diagram depicting a high-level view of certain components of the agent automation framework, in accordance with aspects of the present technique.

Whether the NLU framework 104 is implemented as part of the client instance (as illustrated in FIG. 4A) or shared between multiple client instances (as illustrated in FIG. 4B), the disclosed agent automation framework 100 is capable of generating a number of outputs, including the intent/entity model 108, based on the corpus of utterances 112 and the collection of rules 114 stored in the database 106. FIG. 5 is a block diagram depicting a high-level view of certain components of the agent automation framework 100, in accordance with an embodiment of the present approach. In addition to the NLU framework 104 and the reasoning agent/behavior engine 102 discussed above, the embodiment of the agent automation framework 100 illustrated in FIG. 5 includes a semantic mining framework 130 that is designed to process the corpus of utterances 112, with the help of the NLU framework 104, to generate and improve the intent/entity model 108 and to improve the conversation model 110.

More specifically, for the illustrated embodiment, the semantic mining framework 130 includes a number of components that cooperate with other components of the agent automation framework 100 (e.g., the NLU framework 104, the vocabulary manager 118) to facilitate generation and improvement of the intent/entity model 108 based on the corpus of utterances 112 stored in the database 106. That is, as discussed in greater detail below, the semantic mining framework 130 cooperates with the NLU framework 104 to decompose utterances 112 into intents and entities, and to map these to intent vectors 132 within a vector space. In certain embodiments, certain entities (e.g., intent-specific or non-generic entities) are handled and stored as parameterizations of corresponding intents of the intent vectors within the vector space. For example, in the utterance, "I want to buy the red shirt," the entity "the red shirt" is treated as a parameter of the intent "I want to buy," and can be mapped into the vector space accordingly. The semantic mining framework 130 also groups the intent vectors based on meaning proximity (e.g., distance between intent vectors in the vector space) to generate meaning clusters 134, as discussed in greater detail below with respect to FIG. 6, such that distances between various intent vectors 132 and/or various meaning clusters 134 within the vector space can be calculated by the NLU framework 104, as discussed in greater detail below.

For the embodiment illustrated in FIG. 5, the semantic mining framework 130 begins with a semantic mining pipeline 136, which is an application or engine that generates the aforementioned intent vectors 132, as well as suitable meaning clusters 134, to facilitate the generation of the intent/entity model 108 based on the corpus of utterances 112. For example, in certain embodiments, the semantic mining pipeline 136 provides all levels of possible categorization of intents found in the corpus of utterances 112. Additionally, the semantic mining pipeline 136 produces a navigable schema (e.g., cluster formation trees 137 and/or dendrograms) for intent and intent cluster exploration. As discussed below, the semantic mining pipeline 136 also produces sample utterances 138 that are associated with each meaning cluster, and which are useful to cluster exploration and training of the reasoning agent/behavior engine 102 and/or the conversation model 110. In certain embodiments, the outputs 139 of the semantic mining pipeline 136 (e.g., meaning clusters 134, cluster formation trees 137, sample utterances 138, and others discussed below) may be stored as part within one or more tables of the database 106 in any suitable manner.

Once the outputs 139 have been generated by the semantic mining pipeline 136, in certain embodiments, an intent augmentation and modeling module 140 may be executed to generate and improve the intent/entity model 108. For example, the intent augmentation and modeling module 140 may work in conjunction with other portions of the NLU framework 104 to translate mined intents into the intent/entity model 108. In particular, meaning clusters 134 may be used by the intent augmentation and modeling module 140 as a basis for intent definition. This follows naturally from the fact that meaning proximity is used as the basis for formation of the meaning clusters 134. As such, related and/or synonymous intent expressions are grouped together and, therefore, can be used as primary or initial samples for intents/entities when creating the intent/entity model 108 of the agent automation framework 100. Additionally, in certain embodiments, the intent augmentation and modeling module 140 utilizes a rules-based intent augmentation facility to augment sample coverage for discovered intents, which makes intent recognition by the NLU engine 116 more precise and generalizable. In certain embodiments, the intent augmentation and modeling module 140 may additionally or alternatively include one or more cluster cleaning steps and/or one or more cluster data augmentation steps that are performed based on the collection of rules 114 stored in the database 106. This augmentation may include a rule-based re-expression of sample utterances included in the discovered intent models and removal of structurally similar re-expressions/samples within the discovered model data. For example, this augmentation can include an active-to-passive re-expression rule, wherein a sample utterance "I chopped this tree" may be converted to "this tree was chopped by me". Additionally, since re-expressions (e.g., "buy this shoe" and "purchase this sneaker") have the same parse structure and similarly labeled parse node words that are effectively synonyms, this augmentation can also include removing such structurally similar re-expressions.

For the embodiment illustrated in FIG. 5, the semantic mining framework 130 includes an intent analytics module 142 that enables visualization of conversation log statistics, including intent and entity prevalence, and so forth. The illustrated embodiment also includes a conversation optimization module 144 that works in conjunction with the intent analytics module 142 to identify blind spots or weak points in the conversation model 110. For example, in an embodiment, the intent analytics module 142 may determine or infer intent prevalence values for certain intents based on cluster size (or another suitable parameter). Subsequently, intent prevalence values can be used by the conversation optimization module 144 as a measure of the popularity of queries that include particular intents. Additionally, when these intent prevalence values are compared to intents associated with particular responses in the conversation model 110, the conversation optimization module 144 may identify portions of the conversation model 110 that provide insufficient coverage (e.g., blind-spot discovery). That is, when the conversation optimization module 144 determines that a particular intent has a particularly high prevalence value and is not associated with a particular response in the conversation model 110, the conversation optimization module 144 may identify this deficiency (e.g., to a designer of the reasoning agent/behavior engine 102), such that suitable responses can be associated with these intents to improve the conversation model 110. Additionally, in certain embodiments, the intent analytics module 142 may determine a number of natural clusters within the meaning clusters 134, and the conversation optimization module 144 may compare this value to a number of breadth of intents associated with responses in the conversation model 110 to provide a measure of sufficiency of the conversation model 110 to address the intent vectors 132 generated by the semantic mining pipeline 136.

Figure 6:
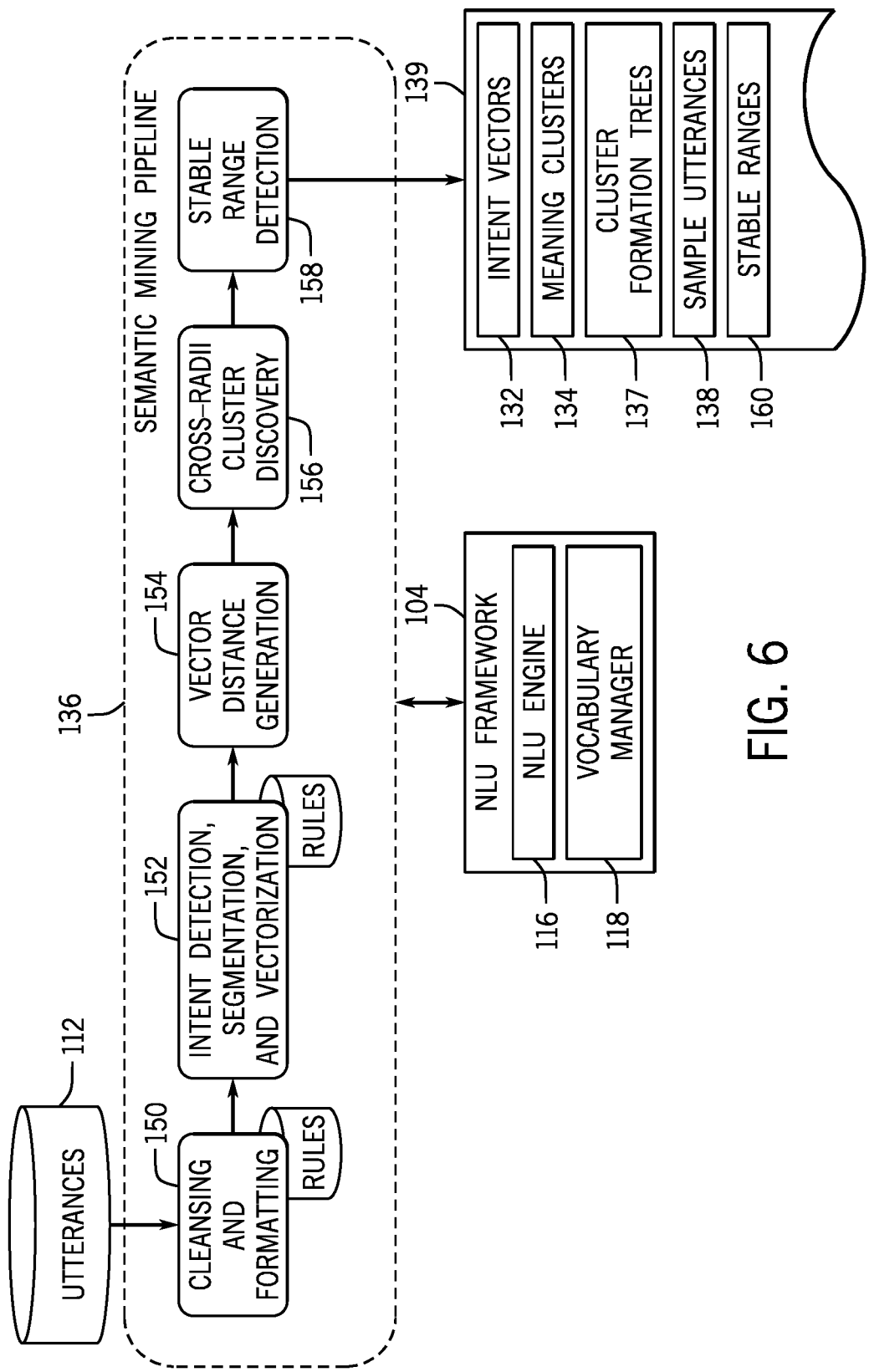
FIG. 6 is a block diagram of a semantic mining pipeline illustrating a number of processing steps of a semantic mining process, in accordance with aspects of the present technique.

FIG. 6 is a block diagram of a semantic mining pipeline 136 that includes a number of processing steps of a semantic mining process used to generate outputs 139 to facilitate the generation of the intent/entity model 108 from the corpus of utterances 112 stored in the database 106, in accordance with embodiments of the present approach. As such, the steps that are illustrated as part of the semantic mining pipeline 136 may be stored in suitable memory (e.g., memory 86) and executed by suitable a suitable processor (e.g., processor 82) associated with the client instance 42 (e.g., within the data center 22).

For the illustrated embodiment, the semantic mining pipeline 136 includes a cleansing and formatting step 150. During the cleansing and formatting step 150, the processor 82 analyzes the corpus of utterances 112 stored in the database 106 and removes or modifies any source data that may be problematic for intent mining, or to speed or facilitate intent mining. For example, the processor 82 may access rules 114 stored in the database 106 that define or specify particular features that should be modified within the corpus of utterances 112 before intent mining of the utterances 112 occurs. These features may include special characters (e.g., tabs), control characters (e.g., carriage return, line feed), punctuation, unsupported character types, uniform resource locator (URLs), internet protocol (IP) addresses, file locations, misspelled words and typographical errors, and so forth. In certain embodiments, the vocabulary manager 118 of the NLU framework 104 may perform at least portions of the cleansing and formatting step 150 to substitute out-of-vocabulary words based on synonyms and domain-specific meanings of words, acronyms, symbols, and so forth, defined with the rules 114 stored in the database 106.

For the illustrated embodiment, after cleansing and formatting, the utterances undergo an intent detection, segmentation, and vectorization step 152. During this step, the processor 82 analyzes the utterances using the NLU framework 104, including the NLU engine 116 and the vocabulary manager 118, to detect and segment the utterances into intents and entities based on the rules 114 stored in the database 106. As discussed, in certain embodiments, certain entities can be stored in the intent/entity model 108 as parameters of the intents. Additionally, these intents are vectorized, meaning that a respective intent vector is produced for each intent by the NLU framework 104. As used herein, a "vector" refers to a linear algebra vector that is an ordered n-dimensional list of values (e.g., a 1×N or an N×1 matrix) that provides a mathematical representation that encodes an intent. It may be appreciated by those skilled in the art that these vectors may be generated by the NLU framework 104 in a number of ways. For example, in certain embodiments, the NLU framework 104 may algorithmically generate these vectors based on pre-built vectors in a database (e.g., a vector for an intent "buy a shoe" might include a pre-built vector for "buy" that is modified to account for the "shoe" parameter). In another embodiment, these vectors may be based on the output of an encoder portion of an encoder-decoder pair of a translation system that consumes the intents as inputs.

For the illustrated embodiment, after intent detection, segmentation, and vectorization, a vector distance generation step 154 is performed. During this step, all of the intent vectors produced in block 152 are processed to calculate distances between all intent vectors (e.g., as a two-dimensional matrix). For example, the processor 82 executes a portion of the NLU framework 104 (e.g., the NLU engine 116) that calculates the relative distances (e.g., Euclidean distances, or another suitable measure of distance) between each intent vector in the vector space to generate this distance matrix, which is later used for cluster formation, as discussed below.

For the illustrated embodiment, after vector distance generation, a cluster discovery step 156 is performed. In certain embodiments, this may be a cross-radii cluster discovery process; however, in other embodiments, other cluster discovery processes can be used, including, but not limited to, agglomerative clustering techniques (e.g., Hierarchical Agglomerative Clustering (HAC)), density based clustering (e.g., Ordering Points To Identify the Clustering Structure (OPTICS)), and combinations thereof, to optimize for different goals. For example, discussion cluster discovery may more benefit from density-based approaches, such as OPTICS, while intent model discovery may benefit more from agglomerative techniques, such as HAC.

For example, in one embodiment involving a cross-radii cluster discovery process, the processor 82 attempts to identify a radius value that defines a particular cluster of intent vectors in the vector space based on the calculated vector distances. The processor 82 may determine a suitable radius value defining a sphere around each intent vector, wherein each sphere contains a cluster of intent vectors. For example, the processor 82 may begin at a minimal radius value (e.g., a radius value of 0), wherein each intent vector represents a distinct cluster (e.g., maximum granularity). The processor 82 may then repeatedly increment the radius (e.g., up to a maximum radium value), enlarging the spheres, while determining the size of (e.g., the number of intent vectors contained within) each cluster, until all of the intent vectors and meaning clusters merge into a single cluster at a particular maximum radius value. It may be appreciated that cross-radii cluster discovery may be better understood with respect to the cluster dendrogram of FIG. 8, discussed below. It may also be appreciated that the disclosed cross-radii cluster discovery process represents one example of a cluster discovery process, and in other embodiments, cluster discovery may additionally or alternatively incorporate measures and targets for cluster density, reachability, and so forth.

Figure 7:
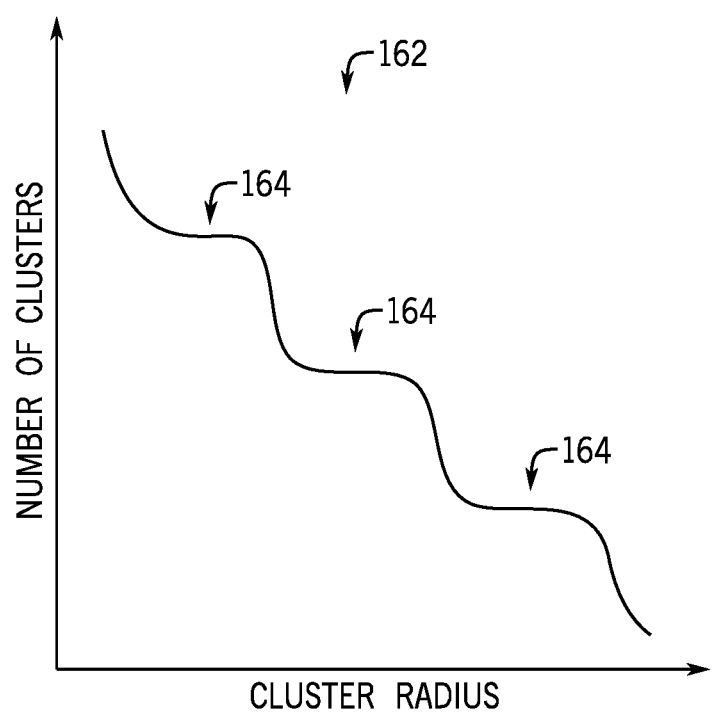
FIG. 7 is a graph indicating a number of meaning clusters over a range of cluster radii values, in accordance with aspects of the present technique.

For the illustrated embodiment, after cluster discovery, a stable range detection step 158 is performed. For example, for embodiments that utilize the cross-radii cluster discovery process discussed above, the processor 82 analyzes the radius values relative to the cluster sizes determined during cluster discovery 156 to identify stable ranges 160 of radius values, indicating that natural clusters are being discovered within the vector space. Such natural intent clusters are commonly present within a corpus of utterances, and are generally particular to a language and/or a context/domain. For example, as illustrated in the graph 162 of FIG. 7, over certain ranges of cluster radius values (e.g., in flatter regions 164), as the cluster radius value increases, a number of clusters remains more stable (e.g., does not substantially increase or changes less than in surrounding regions), indicating natural intent clusters. In other words, stable ranges of cluster radius values can be identified via dips or decreases in the slope of the curve of the graph 162, wherein the curve has a slope that is flatter (e.g., closer to zero value) relative to slopes of the surrounding graph segments. Additionally, these flatter regions 164 can be ranked based on slope flatness (e.g., how close the slope is to having a zero value) and/or span (e.g., a range of cluster radius values over which the slope flatness persists, for embodiments that enable a tunable slope deviation threshold). Such ranking methods can be used to prioritize certain dendrogram segments over others for intent model exploration. It should be noted that other algorithms for detecting stable ranges of cluster radius values, as well as different methods ranking these different stable ranges, may be employed in other embodiments. For embodiments in which cluster discovery incorporates other measures, the stable range detections may similarly be based on these measures (e.g., density, purity, and so forth). In addition, the processor 82 generates data structure (e.g., cluster formation trees 137) that can be visualized and navigated, such that a user (e.g., a designer of the reasoning agent/behavior engine 102) can identify and/or modify how intent vectors are being clustered.

As such, multi-level clustering can be performed to detect stable ranges of natural cluster formation. It may be appreciated that, in some embodiments, given additional data, further clustering may be possible to do further categorization of meaning vectors. For example, in certain embodiments, if the corpus of utterances 112 is annotated or labeled to include additional details (e.g., resolutions for intents in the utterances 112), then these details may be used to appropriately cluster, or refine the clustering, of particular intent vectors. In addition to the meaning clusters 134, an outputs 139 of the semantic mining framework 130 include cluster formation trees or dendrograms that enable navigation of the meaning clusters 134 to provide insight into cluster amalgamation and clustering speed. The outputs 139 of the semantic mining framework 130 include the stable ranges 160 and the sample utterances 138, as discussed above, which also enable a designer of a reasoning agent/behavior engine 102 to have a better understanding of the intent vectors 132 and the meaning clusters 134 generated by the semantic mining pipeline 136.

Figure 8:
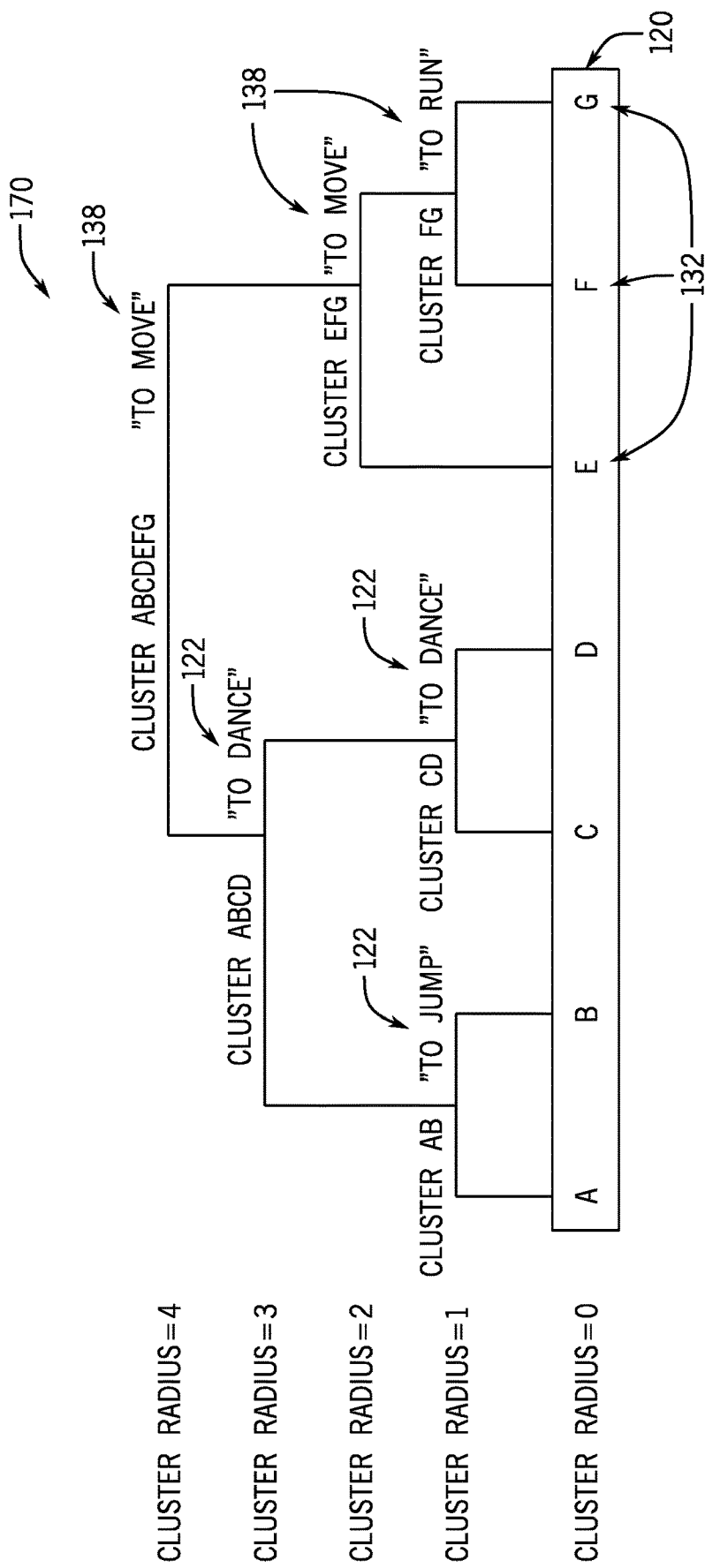
FIG. 8 is a cluster dendrogram that is a visualization of a cluster formation tree generated by the semantic mining pipeline during the semantic mining process, in accordance with aspects of the present technique.

FIG. 8 is an example cluster dendrogram 170 that is a visualization of a cluster formation tree that may be generated by embodiments of the semantic mining pipeline 136 during a semantic mining process, in accordance with embodiments of the present approach. For the cluster dendrogram 170 illustrated in FIG. 8, the letters A, B, C, D, E, F, and G each represent proximate (e.g., adjacent or neighboring) intent vectors 132, as discussed above with respect to the step 152 of FIG. 6. While a distance between each of the intent vectors A-G is illustrated as being the same for simplicity in FIG. 8, it should be understood that the actual vector distance between the illustrated intent vectors 132 varies. For the example dendrogram 170 illustrated in FIG. 8, the intent vector A represents the intent "I want to jump," and closely related intent vector B represents the intent "I want to hop." Intent vector C represents the intent "I want to spin," and closely related intent vector D the represents the intent "I want to dance." Intent vector E represents the intent "I want to move." Intent vector F represents the intent "I want to dash," and closely related intent vector G the represents the intent "I want to sprint."

With this in mind, for the embodiment illustrated in FIG. 8, at a cluster radius of 0, each intent vector represents a distinct cluster (e.g., respective clusters A, B, C, D, E, F, and G). At a cluster radius of 1, three clusters are formed (e.g., cluster AB, cluster CD, and cluster FG) indicating a closest respective vector proximity and meaning proximity between intent vectors A and B, between intent vectors C and D, and between intent vectors F and G, relative to the meaning proximity between other intent vectors (e.g. between intent vectors B and C). At a cluster radius of 2, intent vector E merges with cluster FG to yield cluster EFG. This generally indicates a greater vector distance and meaning distance exists between cluster AB and cluster CD (e.g., between intent vectors B and C, between vectors D and E) than exists between intent vector E and cluster FG (e.g., between intent vectors E and F) within the vector space.

For the cluster dendrogram illustrated in FIG. 8, at a cluster radius of 3, cluster AB and cluster CD merge to yield cluster ABCD. This generally indicates a greater vector distance and meaning distance exists between cluster CD and cluster EFG (e.g., between intent vectors D and E) than exists between clusters AB and cluster CD (e.g., between intent vectors B and C) within the vector space. At a cluster radius of 4, all of the intent vectors merge into a single cluster ABCDEFG. This generally indicates a greatest vector distance exists between cluster ABCD and cluster EFG (e.g., between intent vectors D and E) for the proximate intent vectors 132 of the vector space.

As such, the illustrated cluster dendrogram provides a navigable schema that visually depicts intent vectors 132, meaning clusters 134, and provides indications of relative vector distances and meaning distances between these elements in the vector space. Additionally, for the illustrated embodiment, the cluster dendrogram includes sample utterances 138 for each of the clusters. For example, these sample utterances 138 includes "I want to jump" for cluster AB, "I want to dance" for cluster CD, and "I want to run" for cluster FG. The sample utterance 122 associated with cluster EFG is "I want to move," and the sample utterance 122 associated with cluster ABCD is "I want to dance." Additionally, the sample utterance 122 associated with cluster ABCDEFG is "I want to move." It may be appreciated that, in certain embodiments, sample utterances 138 may be utterances that are representative of intents within each cluster having a relatively higher intent prevalence determined by the intent analytic module 142, as discussed above with respect to FIG. 5. Accordingly, a user (e.g., a designer of a reasoning agent/behavior engine 102) may be able to navigate and explore the various levels of clustering of the meaning clusters 134 within the cluster dendrogram 170, as well as have ready indications of the intents represented by each cluster.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An agent automation system, comprising:
a memory configured to store a corpus of utterances and a semantic mining framework; and
a processor configured to execute instructions of the semantic mining framework to cause the agent automation system to perform actions comprising:
detecting intents within the corpus of utterances;
producing intent vectors for the intents within the corpus;
calculating distances between the intent vectors;
generating meaning clusters of intent vectors based on the distances;
detecting stable ranges of cluster radius values for the meaning clusters; and
generating an intent/entity model from the meaning clusters and the stable ranges of cluster radius values, wherein the intent/entity model stores relationships between a representative intent of each of the meaning clusters and corresponding sample utterances of the corpus, and wherein the agent automation system is configured to use the intent/entity model to classify intents in received natural language requests.

2. The system of claim 1, wherein the processor is configured to execute instructions of the semantic mining framework to cause the agent automation system to perform actions comprising:
cleansing and formatting the corpus of utterances before detecting the intents within the corpus of utterances.

3. The system of claim 1, wherein the memory is configured to store a natural language understanding (NLU) framework, and wherein the processor is configured to produce the intent vectors and to calculate the distances using an NLU engine of the NLU framework.

4. The system of claim 3, wherein the NLU framework comprises a vocabulary manager configured to handle out-of-vocabulary terms by identifying and replacing synonyms and domain-specific meanings of words and acronyms within the corpus of utterances with in-vocabulary terms before detecting the intents within the corpus of utterances.

5. The system of claim 1, wherein the memory is configured to store a conversation model and the processor is configured to execute instructions of the semantic mining framework to cause the agent automation system to perform actions comprising:
performing intent analytics to determine prevalence scores of the meaning clusters; and
identifying blind spots in the conversation model based on the prevalence scores of the meaning clusters of intent vectors.

6. The system of claim 1, wherein at least one intent vector of the intent vectors is associated with at least one corresponding entity as a parameter of the intent vector.

7. The system of claim 1, wherein the corpus of utterances comprises chat logs, email strings, forum entries, support request tickets, recordings of help line calls, or a combination thereof.

8. A method of generating an intent/entity model from a corpus of utterances, comprising:
detecting intents within the corpus of utterances;
producing an intent vector for each of the intents within the corpus;
calculating distances between each of the intent vectors;
generating meaning clusters based on the calculated distances between the intent vectors;
detecting stable ranges of cluster radius values for the meaning clusters; and
generating the intent/entity model from the meaning clusters and the stable ranges of cluster radius values, wherein the intent/entity model stores relationships between a representative intent of each of the meaning clusters and corresponding sample utterances of the corpus.

9. The method of claim 8, comprising:
receiving request from a client device;
classifying one or more intents of the request based on the intent/entity model; and
performing one or more actions in response to the request based on the one or more classified intents and a conversation model.

10. The method of claim 8, wherein detecting intents comprises detecting and segmenting intents based on one or more predefined rules.

11. The method of claim 8, wherein generating meaning clusters comprises generating a cluster formation tree that defines the meaning clusters at all cluster radius values.

12. The method of claim 11, comprising generating and presenting a dendrogram of the cluster formation tree, wherein the dendrogram provides a navigable schema of the meaning clusters across all cluster radius values.

13. The method of claim 8, wherein detecting stable ranges comprises:
detecting ranges of cluster radius values over which a number of meaning clusters formed increases at a relatively lower rate with increasing cluster radius values.

14. The method of claim 8, wherein detecting stable ranges comprises:

detecting ranges of cluster radius values using agglomerative clustering, density based clustering, or a combination thereof.

15. The method of claim 8, comprising:
performing intent analytics to determine prevalence scores of the meaning clusters in the vectors space; and
identifying and indicating blind spots in a conversation model based on the determined prevalence scores of the meaning clusters, wherein the conversation model stores associations between the intents and corresponding predefined actions.

16. The method of claim 8, comprising selecting sample utterances from the corpus of utterances that are representative of intent vectors in each of the meaning clusters.

17. A non-transitory, computer-readable medium storing instructions executable by a processor of a computing system, the instructions comprising:
instructions to cleanse and format a corpus of utterances;
instructions to detect intents within the corpus of utterances;
instructions to produce intent vectors for each of the intents;
instructions to calculate a distance between each of the intent vectors;
instructions to perform cross-radii cluster discovery to generate meaning clusters of intent vectors;
instructions to detect stable ranges of cluster radius values for the meaning clusters; and
instructions to generate an intent/entity model based on the meaning clusters and stable ranges of cluster radius values, wherein the intent/entity model stores relationships between a representative intent of each of the meaning clusters and corresponding sample utterances of the corpus;
instructions to classify one or more intents of a request based on the intent/entity model; and
instructions to perform one or more actions in response to the request based on the one or more classified intents and a conversation model that associates the one or more classified intents with the one or more actions.

18. The medium of claim 17, comprising instructions to generate a cluster formation tree or a dendrogram that includes the meaning clusters, wherein the cluster formation tree is a navigable schema of the meaning clusters.

19. The medium of claim 17, wherein the instructions to cleanse and format the corpus of utterances and the instructions to detect intents within the corpus of utterances include instructions based on one or more rules stored in a rules database.

20. The medium of claim 17, wherein the intent vectors are produced by a natural language understanding (NLU) engine, and the distances between the intent vectors are calculated by the NLU engine.

* * * * *